(12) United States Patent
Bottarel et al.

(10) Patent No.: US 8,803,342 B2
(45) Date of Patent: Aug. 12, 2014

(54) DEVICE AND RELATIVE METHOD FOR SCAVENGING ENERGY

(75) Inventors: Valeria Bottarel, Novara (IT); Giulio Ricotti, Broni (IT); Sandro Rossi, Pavia (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 98 days.

(21) Appl. No.: 13/243,058

(22) Filed: Sep. 23, 2011

(65) Prior Publication Data

US 2012/0133151 A1 May 31, 2012

(30) Foreign Application Priority Data

Nov. 30, 2010 (IT) ................ VA2010A0087

(51) Int. Cl.
*H02K 1/02* (2006.01)
*H01L 41/00* (2013.01)
(52) U.S. Cl.
USPC .......................... 290/1 R; 310/319
(58) Field of Classification Search
USPC .......................... 290/1 R; 310/319
See application file for complete search history.

(56) References Cited

U.S. PATENT DOCUMENTS

| | | | | |
|---|---|---|---|---|
| 6,081,061 A * | 6/2000 | Reineke et al. | .......... | 310/316.03 |
| 6,580,177 B1 * | 6/2003 | Hagood et al. | ............... | 290/1 R |
| 7,132,757 B2 * | 11/2006 | Steigerwald et al. | ........ | 290/1 R |
| 7,453,163 B2 * | 11/2008 | Roberts et al. | ............... | 290/1 R |
| 7,780,535 B2 * | 8/2010 | Hagood et al. | ................. | 463/47 |
| 7,977,852 B2 * | 7/2011 | Ward et al. | .................... | 310/339 |
| 8,076,825 B1 * | 12/2011 | Kaajakari | .................... | 310/339 |
| 8,229,387 B2 * | 7/2012 | Kawakami et al. | .......... | 455/326 |
| 2005/0093302 A1 * | 5/2005 | Miyazaki et al. | ............ | 290/1 R |
| 2006/0237968 A1 * | 10/2006 | Chandrasekaran | .......... | 290/1 R |

OTHER PUBLICATIONS

Suman Dwari and Leila Parsa, Feb. 15-19, 2009, "Low Voltage Energy Harvesting systems Using coil Inductance of Electromagnetic Microgenerators", 978-1-422-2812-0/09/$25.00 IEEE, 1145-1150, cited in IDS.*
Dwari et al., "Low voltage energy harvesting systems using coil inductance of electromagnetic microgenerators", IEEE, 2009, pp. 1145-1150.

* cited by examiner

*Primary Examiner* — Tulsidas C Patel
*Assistant Examiner* — Viet Nguyen
(74) *Attorney, Agent, or Firm* — Allen, Dyer, Doppelt, Milbrath & Gilchrist, P.A.

(57) ABSTRACT

An energy scavenging device includes an electromagnetic transducer adapted to generate a current in response to accelerations impressed thereto. The device also includes a power switching stage input with the current generated by the electromagnetic transducer, having a network of controlled switches adapted to alternately deliver on output nodes of the switching stage an output current that does not invert its sign and to short-circuit the transducer. There is an output capacitor coupled between the output nodes of the power stage. A controller having a sensor coupled to the electromagnetic transducer is to sense the current flowing therethrough, the controller being adapted to drive the switches of the power stage in order to either short-circuit the electromagnetic transducer or to direct the current flowing through the transducer to charge the output capacitor.

8 Claims, 11 Drawing Sheets

DEVICE AND RELATIVE METHOD FOR SCAVENGING ENERGY

FIELD OF THE INVENTION

This invention relates to energy scavenging, and, more particularly, to a device for scavenging electric energy generated by electromagnetic transducers and related methods.

BACKGROUND OF THE INVENTION

Electromagnetic transducers convert motion or vibrations into energy. They generally include, as shown in the sectional view of FIG. 1, a permanent magnet adapted to slide into a solenoid. The equivalent circuit of electromagnetic transducers is shown in FIG. 2.

Commonly, it is understood that the permanent magnet slides through the solenoid with a sinusoidal oscillation motion, thus generating a sinusoidal voltage V on the solenoid in an open circuit condition. The voltage generated by an electromagnetic transducer should be modeled as a sinusoidal voltage with random amplitude and frequency. For sake of simplicity, in the ensuing description it will be assumed that the electromagnetic transducer generates a sinusoidal voltage with constant amplitude and frequency in open circuit conditions, though the same observations hold mutatis mutandis even if a sinusoidal voltage of random amplitude and frequency is considered.

The electric energy generated by electromagnetic transducers is scavenged according to the electric scheme of FIG. 3, using a rectifying bridge of the generated voltage and a common step-up converter charging an output capacitor Cout. This approach is widely used, but its efficiency is relatively poor.

SUMMARY OF THE INVENTION

Deep investigations carried out by the present inventors lead to an inference that, in prior energy scavenging devices, efficiency is poor because most of the electric energy generated by the electromagnetic transducer is dissipated by switching the five diodes and the switch of the step-up. Moreover, the step-up inductor is crossed by the whole DC current that charges the output capacitor and this causes relevant Ohmic losses, thus reducing the overall yield of prior energy scavenging devices.

In order to address these issues, an energy scavenging device is proposed, containing an electromagnetic transducer and adapted to step-up the voltage generated thereby, that may be realized using a power stage with a reduced number of active components (diodes+switches) and using the same inductance of the solenoid of the transducer as a step-up inductor, thus further reducing power losses of the device.

The switches of the power stage are driven by a controller having a sensor coupled to the electromagnetic transducer to sense the current flowing therethrough, the controller being adapted to drive the switches of the power stage in order to either short-circuit the electromagnetic transducer or to direct the current flowing through the transducer to charge the output capacitor.

The controller may implement various energy scavenging methods by driving the switches of the power stage according to different control rules. The invention is defined in the annexed claims.

DETAILED DESCRIPTION OF THE PREFERRED EMBODIMENTS

Figure 1:
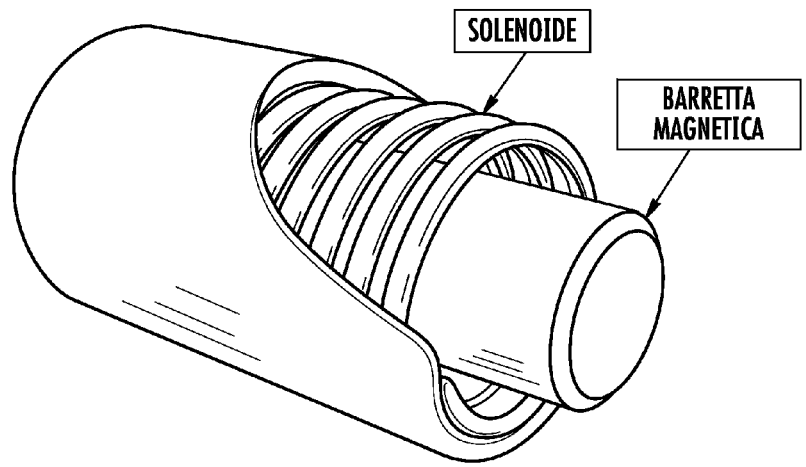
FIG. 1 depicts an electromagnetic transducer, according to the prior art.
Figure 2:
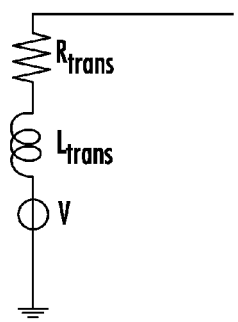
FIG. 2 shows the equivalent circuit of an electromagnetic transducer, according to the prior art.
Figure 3:
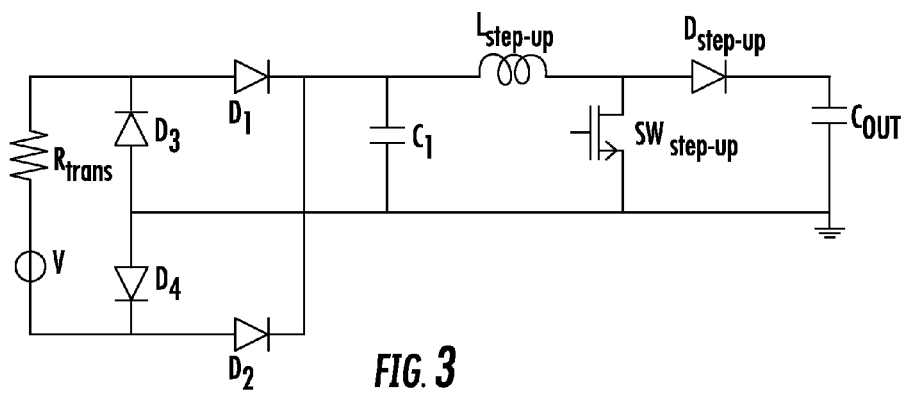
FIG. 3 shows a classic AC-DC step-up converter used for charging a capacitor Cout with an electromagnetic transducer, according to the prior art.
Figure 4:
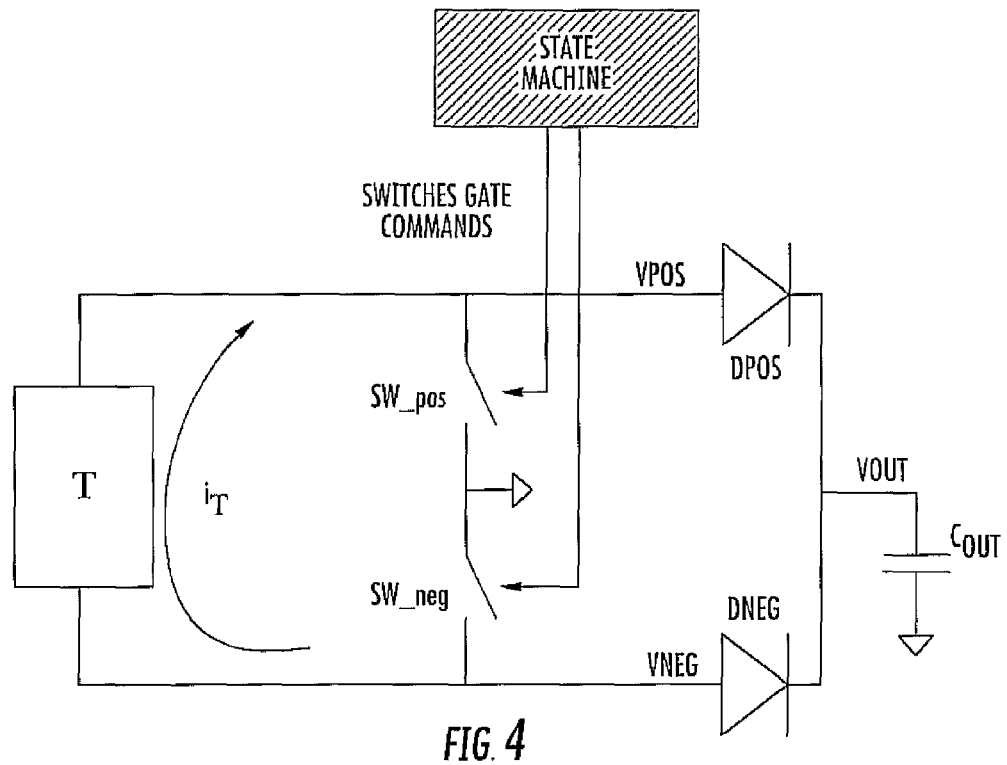
FIG. 4 depicts an architecture of an energy scavenging device, according to the present invention.
Figure 5:
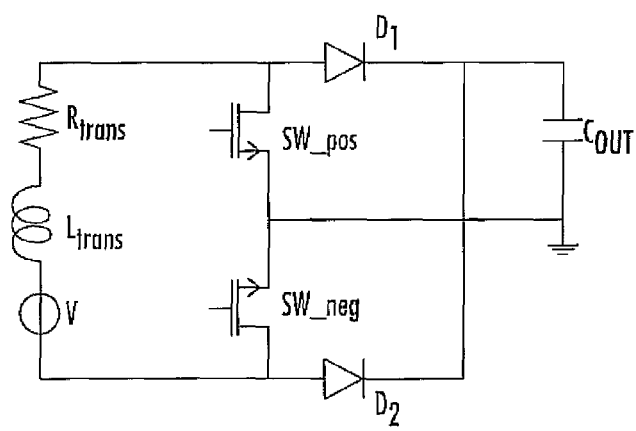
FIG. 5 depicts the equivalent circuit of the novel energy scavenging device of FIG. 4.

An embodiment of an architecture of an energy scavenging device containing an electromagnetic transducer and adapted to implement a step-up rectification is depicted in FIG. 4 and its equivalent circuit is shown in FIG. 5. The device has two diodes and two switches, thus switching losses are reduced over prior art devices. Moreover, Ohmic losses are reduced by using the inductance of the solenoid of the transducer also as a step-up inductor.

Figure 6:
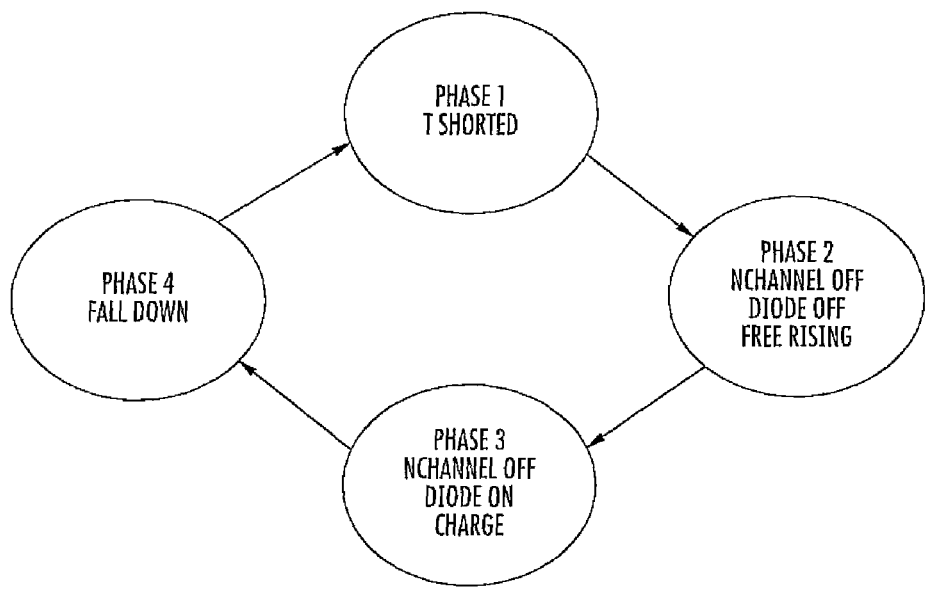
FIG. 6 is a flow chart of the functioning phases of the device of FIG. 4.
Figure 7:
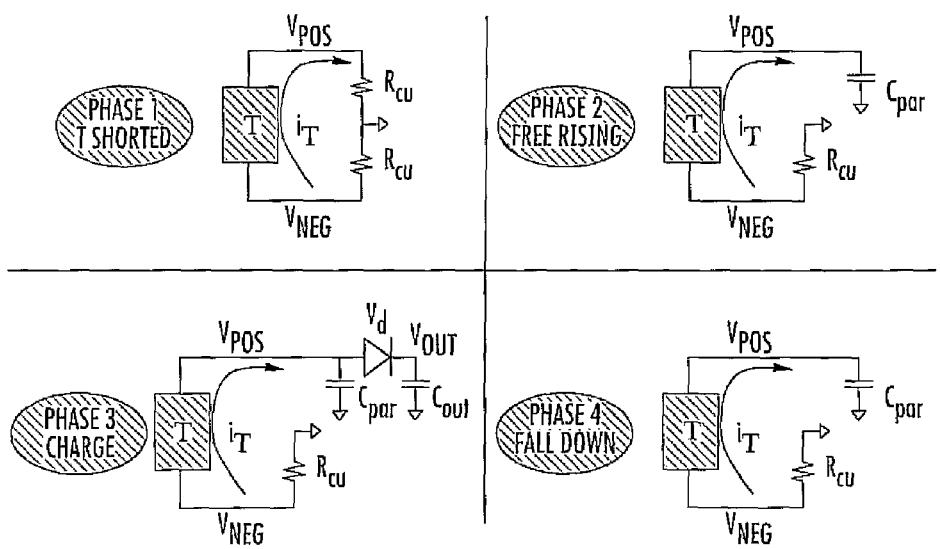
FIG. 7 depicts the equivalent circuits of the device of FIG. 4 during each of the functioning phases of FIG. 6.

The device has a controller STATE MACHINE adapted to monitor the current flowing throughout the transducer T and to close the high-side and the low-side switches such to short-circuit the transducer T. The controller STATE MACHINE is then to configure the switches either to charge an output capacitor Cout, or to keep shorted the transducer until a desired pre-established condition on the current $i_T$ is met. The basic switching phases are summarized in the flow-chart of FIG. 6 and in FIG. 7.

During phase 1, the transducer T is shorted, then a switch is opened (phase 2) and the parasitic capacitance Cpar of a diode is charged. When the capacitance Cpar is charged, the diode enters in a conduction state (phase 3) and the output capacitor Cout is charged by the transducer until the current $i_T$ decreases (phase 4), and both switches are closed again (phase 1).

The controller STATE MACHINE is adapted to control the switches such to keep the transducer shorted when the current $i_T$ is small. Therefore, the current $i_T$ is stepped-up by oscillations of the transducer until this current is adapted to be rectified and used to charge the output capacitor Cout.

The controller STATE MACHINE may be a state machine, a purposely programmed processor, or any other circuit adapted to control the switches of the power stage for implementing any desired method of scavenging energy.

Figure 8A:
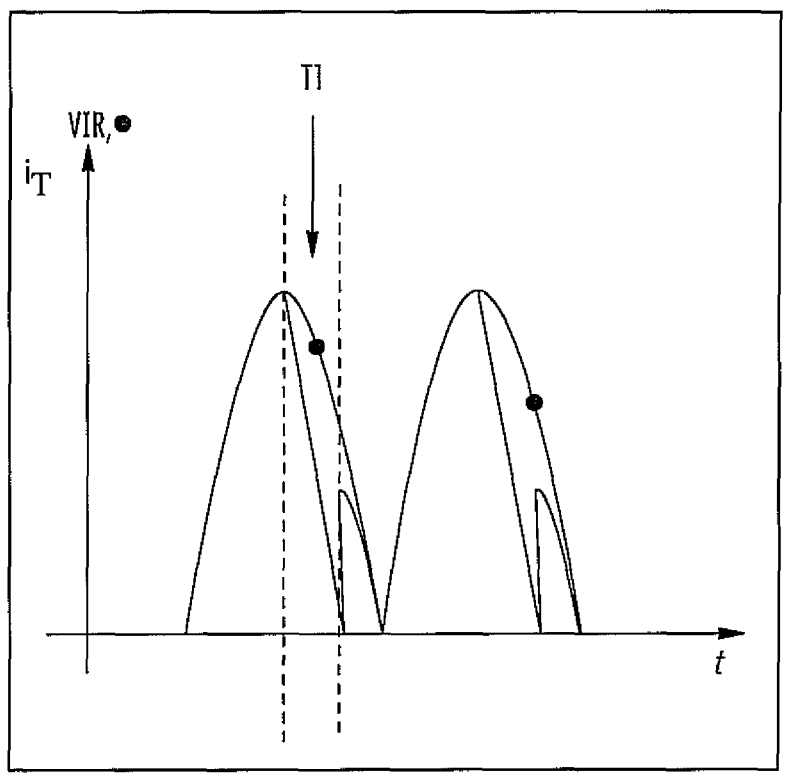
FIGS. 8A and 8B are time graphs that illustrate an embodiment of a method of scavenging energy with the device of FIG. 4.
Figure 8B:
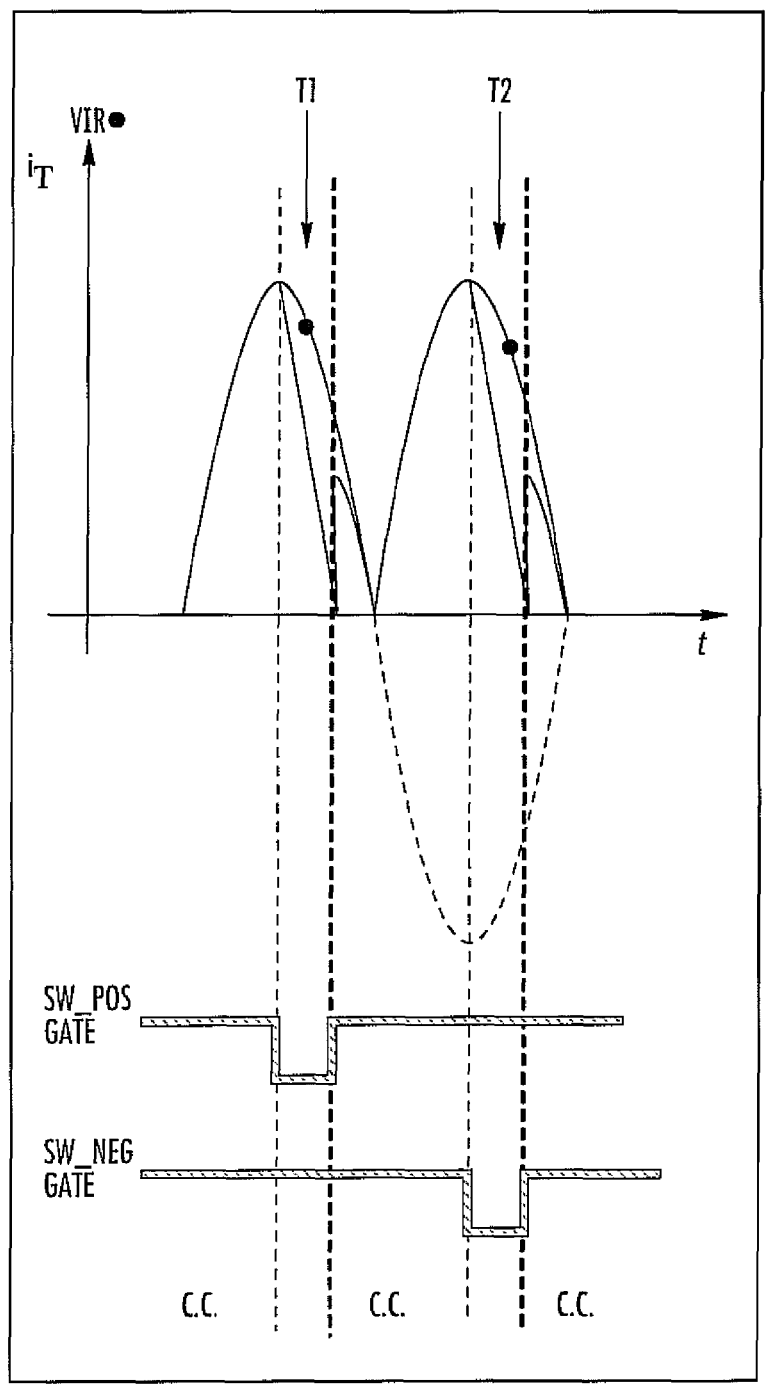

The time graphs of FIG. 8 illustrate a first embodiment of a novel method of scavenging energy using the novel device of FIG. 4. Other embodiments are illustrated by the time graphs of FIGS. 9, 10 and 11.

For ease of understanding, positive half-waves of the generated open circuit voltage V are depicted, so the high-side switch is to be turned on/off whilst the low-side switch is kept closed. Clearly, when positive and negative half-waves are considered, the correct switch to be turned on or off should be identified by checking the direction of the current $i_T$.

According to the embodiment of the method illustrated by the time graphs of FIG. 8, high-side and low-side switches are closed and the current $i_T$ flowing through the transducer T is sensed. When the current $i_T$ attains a peak, the high-side switch is opened and the current generated by the transducer charges the output capacitor Cout until it becomes null (interval T1). Then the opened switch (in the shown example, the high-side switch) is closed again and the same procedure is repeated in the next half-period. With this technique the energy transfer to the output capacitor is triggered twice in a period and when the time derivative of the current flowing through the transducer $i_T$ becomes null.

The above method may be conveniently used when the time interval T1 during which energy is transferred to the output capacitor Cout is not much shorter than a quarter of a period of the voltage generated by the transducer.

Figure 9A:
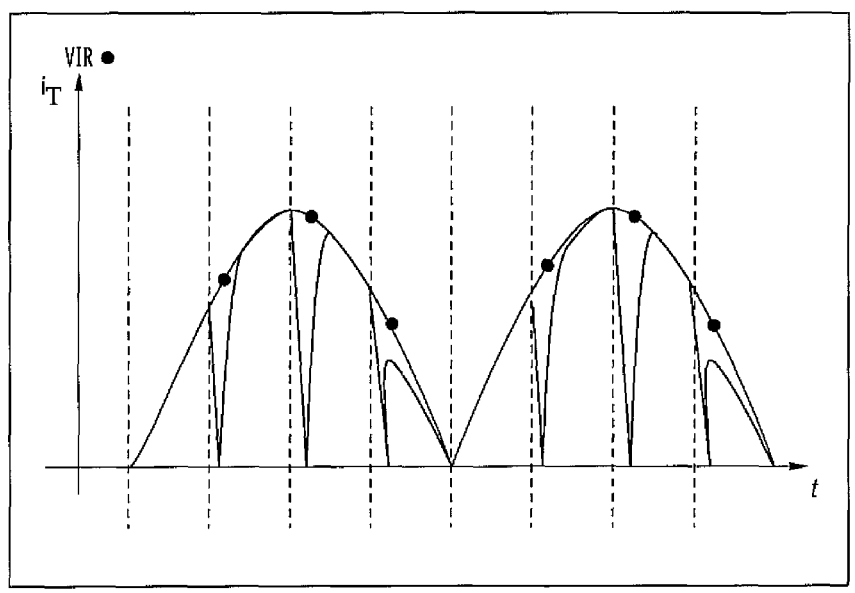
FIGS. 9A and 9B are time graphs that illustrate another embodiment of a method of scavenging energy with the device of FIG. 4.
Figure 9B:
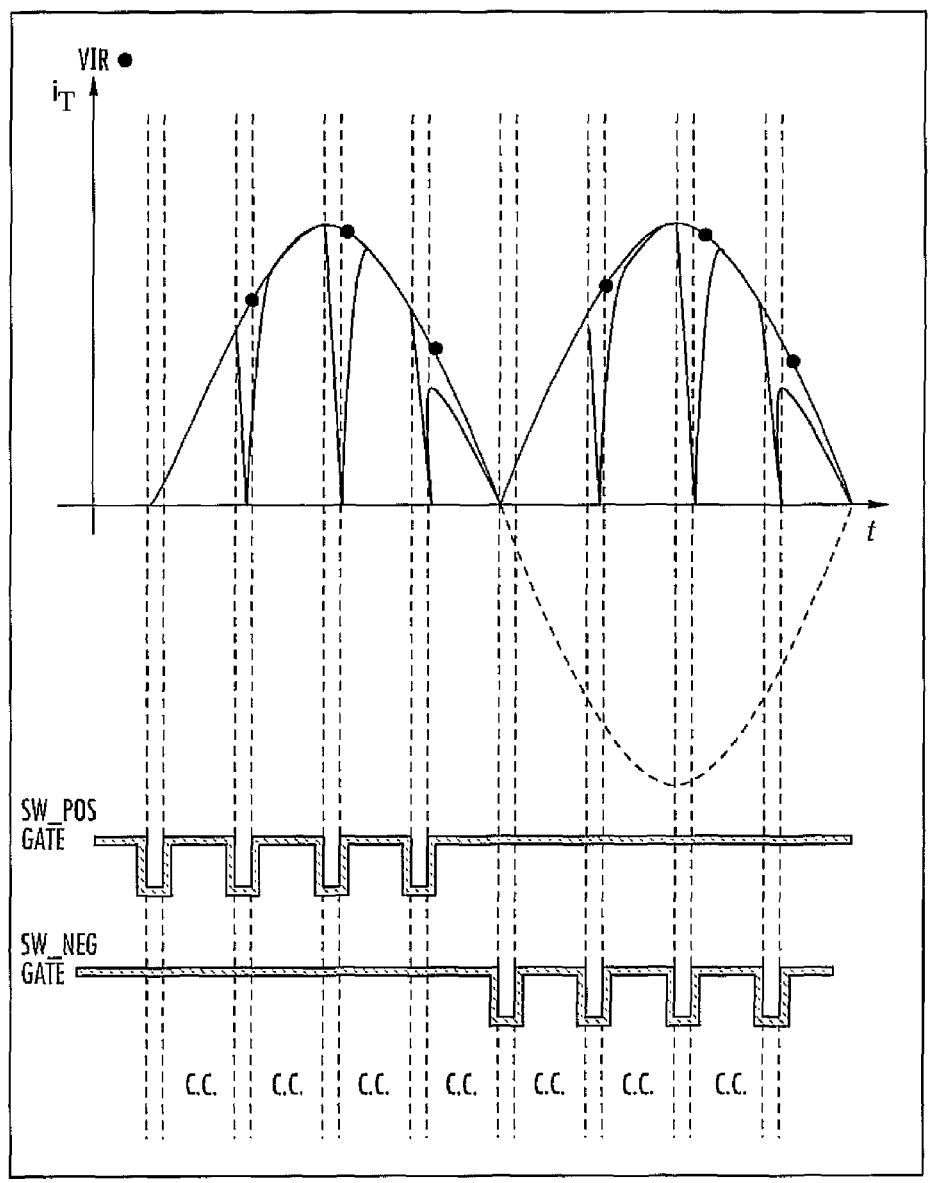

According to another embodiment of the method illustrated by the time graphs of FIG. 9, which is particularly effective when the current through the transducer rapidly drops to zero when charging the output capacitor Cout, the high-side (low-side for negative half-waves) switch is turned off/on a plurality of times with a certain fixed switching frequency during a same half-period of the voltage generated by the transducer. The switching frequency should be determined such to allow the current $i_T$ to become equal to the ratio between the open circuit voltage V of the transducer and the series resistance between the resistance Rtrans of the transducer and the on-resistances of the switches.

With the above technique, energy is transferred to the output capacitor Cout a plurality of times during a same half-period, that is more energy may potentially be transferred to the capacitor Cout, though switching losses are increased in respect to the previously described method.

Figure 10A:
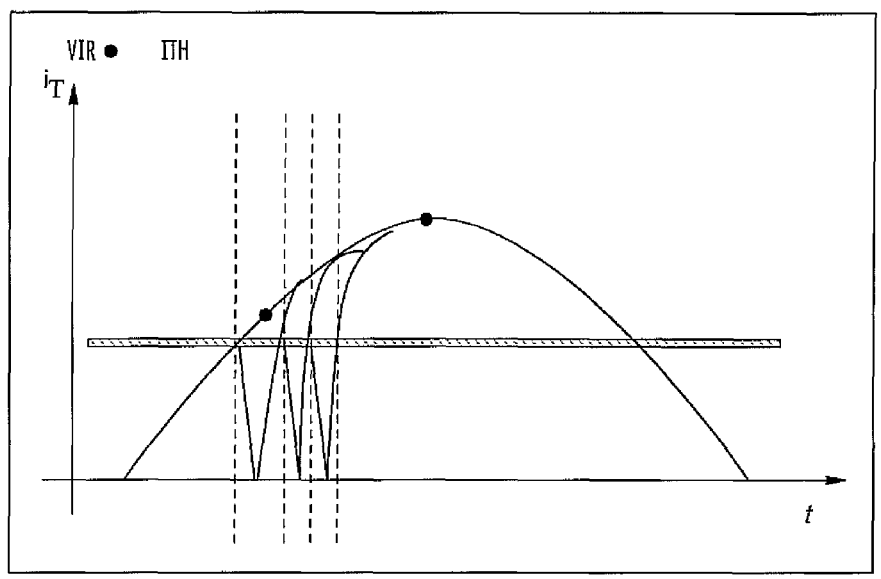
FIGS. 10A and 10B are time graphs that illustrate yet another embodiment of a method of scavenging energy with the device of FIG. 4.
Figure 10B:
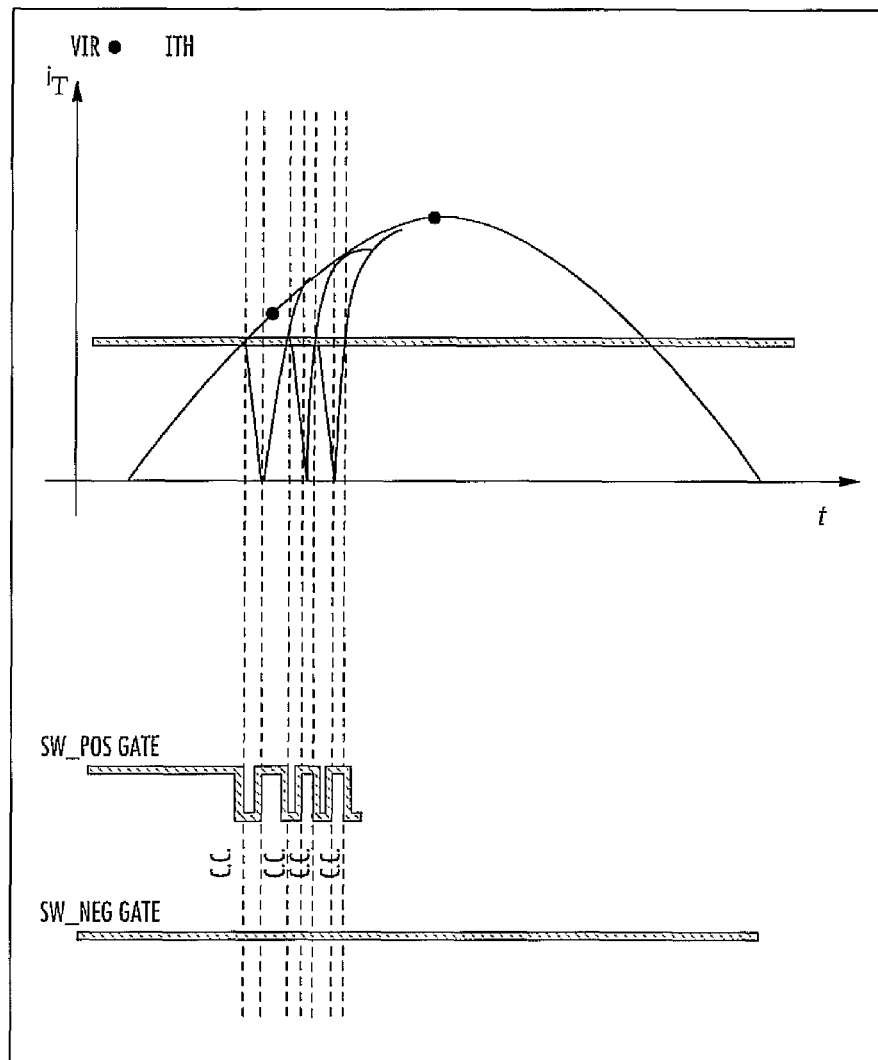

According to yet another embodiment of the method illustrated by the time graphs of FIG. 10, the transducer is kept shorted until the current flowing therethrough crosses a certain nonnull current threshold $i_{th}$, then the high-side (low-side for negative half-waves) switch is turned off in order to transfer energy to the output capacitor. When the current $i_T$ nullifies, the transducer is short-circuited again and the high-side (low-side) switch is turned off again when the current crosses again the threshold $i_{th}$, and so on.

With this technique, the turning on/off of the switches is triggered when the current generated by the transducer attains the nonnull threshold and it is not necessary to wait that the current $i_T$ becomes proportional to the open circuit voltage V of the transducer. According to a preferred option, the threshold $i_{th}$ is determined such to make positive the difference between the energy in the inductance of the transducer and the energy lost during each switching by parasitic capacitances of the device.

Figure 11A:
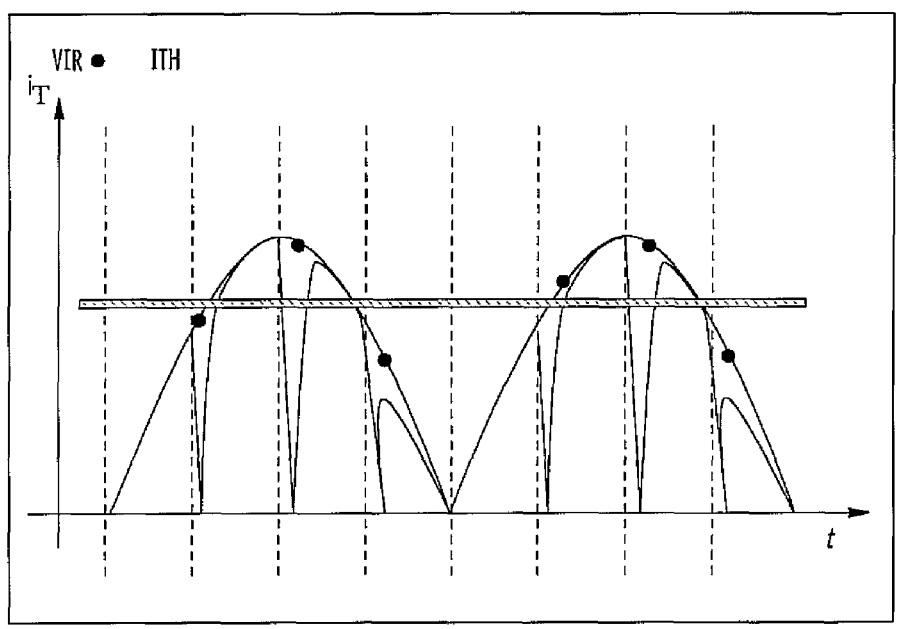
FIGS. 11A and 11B are time graphs that illustrate yet another embodiment of a method of scavenging energy with the device of FIG. 4.
Figure 11B:
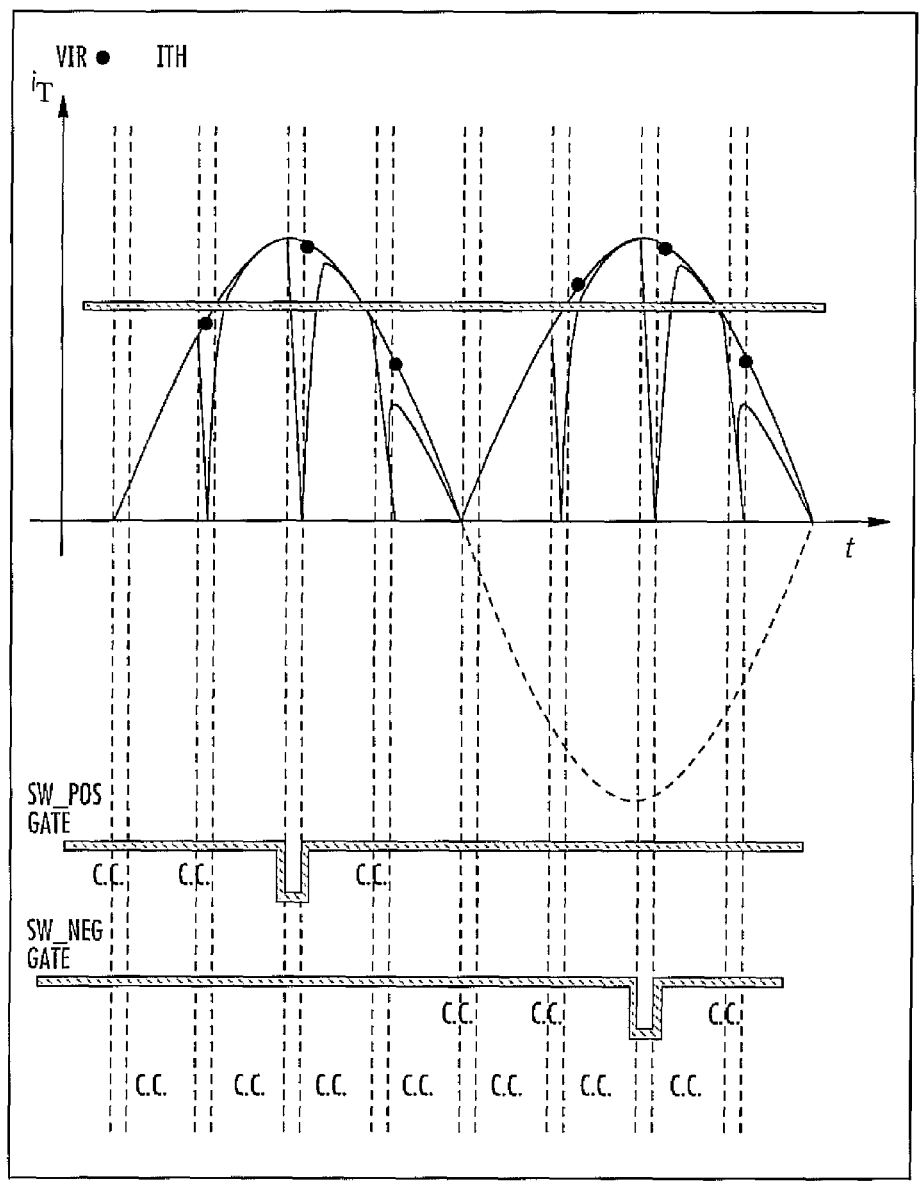

According to yet another embodiment of the method illustrated by the time graphs of FIG. 11, the transducer is kept shorted until the current flowing therethrough crosses the nonnull current threshold $i_{th}$, then the high-side (low-side for negative half-waves) switch is turned off/on a plurality of times with a certain switching frequency during a same half-period of the voltage generated by the transducer. In practice, this technique is a combination of the two preceding techniques.

That which is claimed:

1. An energy scavenging device, comprising:
an electromagnetic transducer configured to generate a current in response to accelerations impressed thereto;
a power switching stage to be input with current generated by said electromagnetic transducer, and comprising a network of controlled switches and output nodes coupled thereto;
said network of controlled switches configured to alternately deliver to said output nodes an output current that does not invert its sign, and to short-circuit said electromagnetic transducer;
an output capacitor coupled between said output nodes and having first and second terminals; and
a controller having a sensor coupled to said electromagnetic transducer configured to sense current flowing therethrough, said controller configured to drive said network of controlled switches to selectively short-circuit said electromagnetic transducer and direct the current flowing through said electromagnetic transducer to charge said output capacitor;
said power switching stage comprising
a high-side switch and a low-side switch coupled in series to short-circuit said electromagnetic transducer when both closed, and a common terminal between the high-side switch and low-side switch being coupled to said first terminal of said output capacitor, and
a high-side diode and a low-side diode each coupled between said second terminal of the output capacitor and said common terminal of said high-side switch and said low-side switch.

2. An energy scavenging device, comprising:
an electromagnetic transducer responsive to accelerations;
a power switching stage coupled to said electromagnetic transducer;
an output capacitor coupled to said power switching stage and having first and second terminals; and
a controller coupled to said electromagnetic transducer and configured to sense current therein and to drive said power switching stage to selectively short-circuit said electromagnetic transducer and direct current flowing through said electromagnetic transducer to charge said output capacitor;
said power switching stage comprising
a high-side switch and a low-side switch coupled in series to short-circuit said electromagnetic transducer when both closed, and a common terminal between the high-side switch and low-side switch being coupled to said first terminal of said output capacitor, and
a high-side diode and a low-side diode each coupled between said second terminal of the output capacitor and said common terminal of said high-side switch and said low-side switch.

3. The energy scavenging device of claim 2, wherein said power switching stage is configured to alternately deliver an output current that does not invert its sign, and to short-circuit said electromagnetic transducer.

4. A method of scavenging energy using a device comprising an electromagnetic transducer configured to generate a current in response to accelerations impressed thereto, a power switching stage input with current generated by the electromagnetic transducer, a network of controlled switches configured to alternately deliver on output nodes of the power switching stage an output current that does not invert its sign and to short-circuit the electromagnetic transducer, an output capacitor coupled between the output nodes and having first and second terminals, a controller having a sensor coupled to the electromagnetic transducer to sense current flowing therethrough, the controller being configured to drive the switches of the power switching stage, the power switching stage comprising a high-side switch and a low-side switch coupled in series to short-circuit the electromagnetic transducer when both closed, and a common terminal between the high-side switch and low-side switch being coupled to the first terminal of the output capacitor, and a high-side diode and a low-side diode each coupled between the second terminal of the output capacitor and the common terminal of the high-side switch and the low-side switch, the method comprising:

monitoring the current flowing through the electromagnetic transducer using the controller; and driving the switches of the power switching stage, using the controller, to short-circuit the electromagnetic transducer, and depending on the current, selectively continuing to short-circuit the electromagnetic transducer and directing the current flowing through the electromagnetic transducer to charge the output capacitor until the current through the electromagnetic transducer nullifies.

5. The method of claim 4, further comprising:

comparing a time derivative of the current flowing through the electromagnetic transducer with a null value, using the controller; and configuring the switches to charge the output capacitor when the time derivative crosses the null value until the current through the electromagnetic transducer nullifies, using the controller.

6. The method of claim 4, further comprising configuring, with a fixed switching frequency, the switches to charge the output capacitor until the current through the electromagnetic transducer nullifies, then to short-circuit the electromagnetic transducer, using the controller.

7. The method of claim 4, further comprising:

comparing the current flowing through the electromagnetic transducer with a non-null threshold, using the controller;

when the current flowing through the electromagnetic transducer exceeds the nonnull threshold, configuring with a fixed switching frequency the switches to charge the output capacitor until the current through the electromagnetic transducer nullifies, then to short-circuit the electromagnetic transducer, using the controller.

8. The method of claim 4, further comprising:

comparing the current flowing through the electromagnetic transducer with a nonnull threshold, using the controller; and keeping the electromagnetic transducer short-circuited when the current is smaller than the nonnull threshold, and directing the current flowing through the electromagnetic transducer to charge the output capacitor until the current through the electromagnetic transducer nullifies, when the current is larger than the nonnull threshold.

* * * * *